No. 867,271. PATENTED OCT. 1, 1907.
P. P. HOFMANN.
AUTOMOBILE HEATING APPLIANCE.
APPLICATION FILED DEC. 15, 1905.

Witnesses
Ray White.
Harry R. L. White.

Inventor:
Paul P. Hofmann,
By Bordes Sain and May
Attys

UNITED STATES PATENT OFFICE.

PAUL P. HOFMANN, OF CHICAGO, ILLINOIS.

AUTOMOBILE-HEATING APPLIANCE.

No. 867,271.   Specification of Letters Patent.   Patented Oct. 1, 1907.

Application filed December 15, 1905. Serial No. 291,854.

*To all whom it may concern:*

Be it known that I, PAUL P. HOFMANN, a citizen of the United States, residing at Chicago, in the county of Cook and State of Illinois, have invented certain new and useful Improvements in Automobile-Heating Appliances, of which the following is a specification.

My invention relates to automobile heating appliances, and has for its salient object to provide a means for utilizing waste heat from the motor parts of an automobile to warm the body of the vehicle, which will be simple in construction, readily applicable to derive heat from a part already contained in the automobile structure, and adapted for ready manipulation from the interior of the vehicle, to regulate the heating effect of the appliances upon the body.

With a view to attaining these and other objects which will become apparent to those skilled in the art from the following description, my invention consists in the features of construction and arrangement of parts hereinafter more fully described and specified in the claims.

Figure 1:
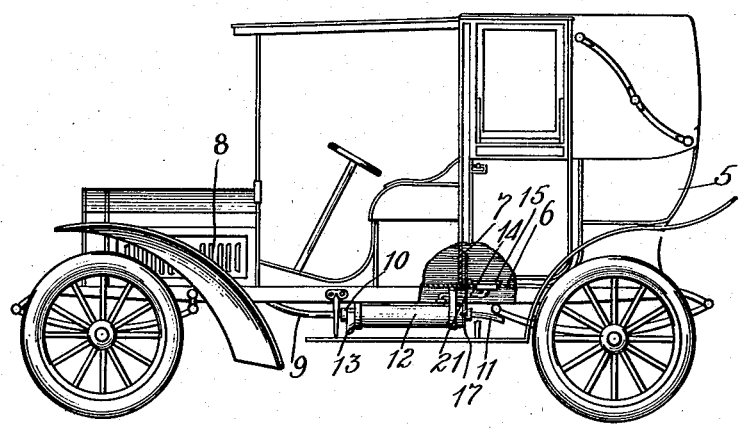
Figure 2:
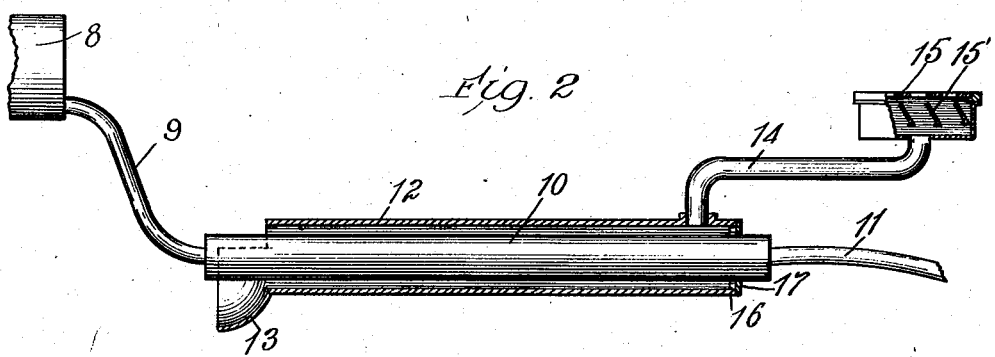
Figure 3:
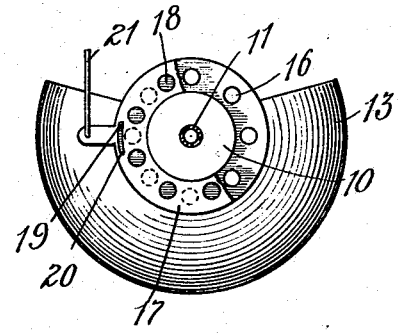

In the drawing: Figure 1 is a side elevation of an automobile of a well known type, equipped with heating appliances embodying my invention. Fig. 2 is an enlarged cross sectional detail of the heating system detached. Fig. 3 is an enlarged end view of the damper arrangement.

Throughout the figures like numerals of reference refer always to like parts.

In the drawing 5 indicates in general the body of an automobile illustrated as of the inclosed type, and whereof 6 is the floor and 7 the front wall of the tonneau.

8 indicates in general the engine structure from which leads the usual exhaust pipe 9, exhausting into a suitable muffler 10 of any usual construction, from which extends the eduction pipe 11. It is common practice to arrange a muffler 10 beneath, or along the side of, the central part of the body, substantially as positioned in Fig. 1, and in order to obtain the best results from the use of my attachment I prefer that the muffler, constituting an ordinary part of the engine, be arranged lengthwise of the machine in such position as to be exposed to the draft caused by the swift passage of the machine when in motion.

The automobile parts described are of old construction and intrinsically form no part of my invention.

My improved heating appliances comprise a muffler jacket adapted to afford a passage for air close around the muffler, to be heated by radiation from the muffler, means for introducing heated air into the body of the automobile, and means for controlling the supply of heated air to the body of the vehicle.

In the specific construction shown 12 indicates a muffler jacket comprising a tubular body surrounding the muffler 10, said jacket being open at its end adjacent the front of the machine, and preferably at said open end provided with a flaring lip 13 extending all or part way around the open end for the purpose of directing air into the jacket 12.

From the rear end of the jacket 12 a flue 14 leads to the area to be heated within the vehicle and terminates in a register 15 of ordinary construction, preferably provided with swinging vanes 15' adapted to close or open the register. The jacket 12 and flue 14 constitute an air passage to conduct air around the muffler into the body of the vehicle. Eduction ports 16 are likewise provided opening from said air passage to a point without the vehicle body, such ports being preferably located at the rear extremity of the jacket 12, in the annular end wall thereof, and means, operable from within the area to be heated, are provided for opening or closing the eduction ports 16.

Specifically 17 indicates an apertured damper plate provided with apertures 18, adapted to open or close the ports 16 according to the position of said plate 17. 19 indicates a stud taking through a curved slot 20 in the plate 17, any suitable number of such studs and slots being provided for maintaining said plate in association with the jacket while permitting its rotary movement to a sufficient extent to open and close the ports 16.

21 indicates a controlling rod extending up to the interior of the automobile body, and at its lower end tangentially connected with the plate 17, so that vertical movement of the rod 21 varies the position of the plate 17 with reference to the apertures or ports 16.

In operation, when the automobile engine is in operation with the vanes 15' opened, and damper 17 closed, the air within the jacket is heated by radiation from the exhaust muffler 10, and the heated air is conducted through the flue 14 to the register 15 in the floor of the vehicle. When the machine is in motion the draft caused by the passage of the automobile positively forces air through the bell-shaped lip 13 into the jacket 12 and thence to the area to be heated. It is obvious that the vanes 15' may be used in the ordinary manner to control the amount of heated air admitted to the vehicle. It will further be apparent that when the plate 17 is so positioned that the ports 16 and 18 register, substantially all of the air heated by the muffler 10 may be discharged without the area of the body to be heated. In this way dual regulation of the heating effect upon the interior of the body is provided for, but it is to be noted that the heating effect should be generally regulated by the plate 17 for the reason that the reduction of heating effect upon the area to be heated by the opening of the plate 17 allows free circulation of air through the jacket and prevents accumulation of heat in the jacket so that the muffler is cooled to better effect.

While I have herein described in some detail a specific embodiment of my invention, which I deem to be new and advantageous and may specifically claim, I do not desire to be understood that my invention is limited to the exact details of the construction, as it will be apparent that changes may be made therein without departure from the spirit and scope of my invention.

Having thus described my invention, what I claim and desire to secure by Letters Patent of the United States, is:

1. In combination with an automobile comprising a body, an engine, a part through which the engine exhausts, heated by such exhaust and located at a level below the body, a jacket arranged to conduct air into such proximity to the exhaust-heated part as to be heated thereby, a flue leading upward from said jacket into the body, said jacket and flue forming an air passage, and one of said parts being provided with an air escape opening to a point without the body; and means operable from within the body for regulating the passage of air through said flue and said escape opening.

2. In combination with a motor vehicle comprising a gas engine motor, and a part providing a passage for the escape of the products of combustion therefrom, a jacket associated with said part, having an inlet opening to the air, and an outlet opening to the air, a flue from said jacket to the area of the vehicle to be heated and means for controlling the delivery of air to or without the area to be heated.

3. In combination with a motor vehicle involving a body, a gas engine, and a passage for the escape of the products of combustion, a jacket surrounding said passage open in part to the air, and provided with air escape openings, means for closing said air escape openings, and a heating flue communicating with said jacket and the body of the vehicle.

4. In combination with a motor vehicle involving a body, a gas engine, and a muffler for said gas engine, a jacket surrounding said muffler, disposed longitudinally of the machine and open at its front end, said jacket having apertures at its rear end, means for closing said apertures and a flue leading from said jacket adjacent its rear end, into the body of the vehicle.

5. In combination with a motor vehicle involving a body, a gas engine and an exhaust muffler for said gas engine, a jacket surrounding said muffler disposed longitudinally of the machine with its front end open, said jacket having an expanded lip partially surrounding the front opening, and being provided with apertures for the escape of air from said jacket, means for regulating the opening of said apertures, a register 15 within the body of the vehicle, and a flue 14 connecting said register and the jacket surrounding the muffler.

6. In combination with a motor vehicle involving an internal-combustion engine, a muffler for said engine, and a body, a jacket surrounding the muffler and spaced apart therefrom to permit circulation of air between the jacket and the muffler, said jacket having an air inlet opening therein near one end, a flue leading from the other end of said jacket, opening into the body of the vehicle, said jacket and flue affording an air passage and being provided with an air opening to the outside of the body of the vehicle, and means operable from within the body of the vehicle for regulating the passage of air through the openings into and to the outside of the vehicle body.

7. The combination with a motor vehicle involving a body to be heated, a gas engine, a muffler for said gas engine disposed longitudinally of the body beneath the same, a jacket surrounding the muffler, spaced apart therefrom and having an inlet near one end thereof; a flue leading upward from the jacket to the body, said jacket and flue forming an air passage, there being an air escape opening from said passage to a point without the body remote from the inlet end, and means operable from within the body for regulating the passage of air through the flue and said escape opening.

In testimony whereof I hereunto set my hand in the presence of two witnesses.

PAUL P. HOFMANN.

In the presence of—
FOREE BAIN,
MARY F. ALLEN.